(12) United States Patent
Willey (10) Patent No.: US 7,137,608 B2
(45) Date of Patent: Nov. 21, 2006

(54) MULTI-PURPOSE UPRIGHT SUPPORT STAND WITH LEG ASSEMBLIES HAVING HINGE-FITTING

(76) Inventor: Kevin E. Willey, 245 Habitat Cir., Windsor, CO (US) 80550

( * ) Notice: Subject to any disclaimer, the term of this patent is extended or adjusted under 35 U.S.C. 154(b) by 263 days.

(21) Appl. No.: 10/688,492

(22) Filed: Oct. 17, 2003

(65) Prior Publication Data

US 2005/0121569 A1    Jun. 9, 2005

Related U.S. Application Data

(60) Provisional application No. 60/419,599, filed on Oct. 18, 2002.

(51) Int. Cl.
*F16M 13/00* (2006.01)
*F16M 11/38* (2006.01)

(52) U.S. Cl. ...................... 248/519; 248/168

(58) Field of Classification Search ................ 248/168, 248/519, 166, 169, 440, 188.2, 188.6, 523, 248/525, 521
See application file for complete search history.

(56) References Cited

U.S. PATENT DOCUMENTS

| | | | | |
|---|---|---|---|---|
| 624,662 | A | * | 5/1899 | Leedy ...................... 248/187.1 |
| 1,064,798 | A | * | 6/1913 | Walte .......................... 248/171 |
| 1,421,398 | A | * | 7/1922 | Burchess ..................... 248/523 |
| 1,769,127 | A | * | 7/1930 | Finnegan ..................... 248/524 |
| 2,031,097 | A | * | 2/1936 | Gustov ..................... 248/123.2 |
| 2,388,287 | A | * | 11/1945 | Richardson ............ 248/188.91 |
| 2,493,978 | A | * | 1/1950 | Kromer ....................... 248/171 |
| 2,849,202 | A | * | 8/1958 | McCombs ................... 248/515 |
| 3,208,698 | A | * | 9/1965 | Samhammer et al. ....... 248/650 |
| 3,312,432 | A | * | 4/1967 | Pfeiffer et al. .............. 248/646 |
| 3,888,057 | A | * | 6/1975 | Zubke .......................... 52/163 |
| 4,196,881 | A | | 4/1980 | Davidson .................... 248/157 |

(Continued)

OTHER PUBLICATIONS

Conventional tripod-type camera stands such as those distributed by Davis & Sanford online, three sheets retrieved, and printed on Oct. 6, 2003, from www.tiffen.com/tripod_page.htm.

(Continued)

*Primary Examiner*—Anita M. King
(74) *Attorney, Agent, or Firm*—Macheledt Bales & Heidmiller LLP (57) ABSTRACT

A unique collapsible apparatus for supporting an article; the apparatus has at least a first, second, and third leg assembly, an upper end of each leg assembly pivotally secured to extend from an upper support member in a generally symmetrical fashion. A lower end of each leg assembly pivotally secured to extend from a lower support member (which may be in the shape of a collar). Each leg assembly has a unique hinge-fitting interconnecting a first and second elongated subassembly; a hinge-fitting may comprise a first and second extension pivotally enjoined. Each hinge-fitting permits a pivot range of rotation; preferably, this pivot range may be up to 90-degrees, up to 170-degrees, or just under 180-degrees. The elongated subassemblies may each be comprised of a plurality of telescoping tubular sections adapted for interlock. The telescoping tubular sections of an elongated subassembly may be sized for interchangeability with telescoping tubular sections of another elongated subassembly. Upper support member may have a plurality of fork extensions to which upper ends of the leg assemblies are pivotally secured. Upper support member may have an aperture for accepting an article, e.g., aperture will be sized to accept the periphery of the article. Lower collar support member may be adapted for accepting a lower-end of the article for placement on/in connection with a ground.

24 Claims, 9 Drawing Sheets

U.S. PATENT DOCUMENTS

| | | | | |
|---|---|---|---|---|
| 4,334,621 A | * | 6/1982 | Weber | 211/70.3 |
| 4,570,886 A | * | 2/1986 | Mooney | 248/186.1 |
| 4,988,064 A | * | 1/1991 | Hoshino | 248/170 |
| 5,192,055 A | * | 3/1993 | Griggs et al. | 256/35 |
| 5,248,119 A | * | 9/1993 | Imura | 248/65 |
| 5,310,145 A | * | 5/1994 | Chen | 248/170 |
| 5,482,245 A | * | 1/1996 | Graves | 248/523 |
| 5,515,656 A | * | 5/1996 | Mihalich | 52/155 |
| 5,836,516 A | * | 11/1998 | Van Epps et al. | 239/280.5 |
| 6,050,034 A | * | 4/2000 | Krinner | 52/155 |
| 6,189,834 B1 | * | 2/2001 | Dietz et al. | 244/137.1 |
| 6,375,135 B1 | | 4/2002 | Eason et al. | 248/166 |
| 6,454,228 B1 | | 9/2002 | Bosnakovic | 248/177.1 |
| 6,508,369 B1 | * | 1/2003 | Wang | 211/60.1 |
| 6,932,223 B1 | * | 8/2005 | Lee et al. | 211/70.6 |

OTHER PUBLICATIONS

Partial page brochure depicting both tripod-type and unipod-type camera stands distributed by Davis & Sanford.

* cited by examiner

MULTI-PURPOSE UPRIGHT SUPPORT STAND WITH LEG ASSEMBLIES HAVING HINGE-FITTING

This application claims the benefit of U.S. provisional patent application No. 60/419,599 filed 18 Oct. 2002 on behalf of the applicant hereof.

BACKGROUND OF THE INVENTION

In general, the present invention relates to portable support stands, such as those used for supporting a camera, survey equipment, telescope, holiday trees, as well as printed sheet music stands—all of which utilize multiple legs (most often in a tripod style) to support a specifically identified article for which the stand has been designed. While many of the current stand designs provide a certain basic amount of stability, each of these stands is quite limited in that each is designed to support the item for which it was specifically designed. Furthermore, most all of these traditional stand designs cannot be set up on ground that is not planar and level; few of these conventional designs provide much, if any, support when a gust of wind or inclement weather hits (heavy wind, rain, etc.); and in most-every case, traditional stand designs are suitable for use to support a single article.

As one will readily appreciate in connection with the instant technical disclosure, applicant has designed a unique portable, collapsible, multi-purpose structure having at least three leg assemblies, each of which has an adjustable length that pivotally interconnects at least one upper support member with one lower support member, for use to support a wide variety of items/articles in a wide variety of environments. More-particularly applicant's invention is directed to a structure having multiple leg assemblies pivotally secured to extend from upper and lower support members. Each leg assembly is of a variable-length style, whereby at least first and second elongated subassemblies are paired and. interconnected by a hinge-fitting; at least one of the subassemblies being adjustable in length. The hinge-fitting mechanism is adapted to permit a pivot range, preferably this can be up to ~90-degress to up to nearly 180 degrees of rotation, through which the hinge-fitting may be rotated to allow for handy adaptation to uneven ground (various configurations of the unique apparatus of the invention may be achieved) as well as for collapsing the structure to facilitate transport and storage between use. Each hinge-fitting mechanism is adapted with appropriate stabilizing, gripping/frictional, rolling-frictional, etc. means to aid in balance as well as positioning, or repositioning, of the structure in use. An upper-end of each leg assembly is pivotally secured to and extends from the upper support member in a symmetrical fashion; likewise, a lower-end of each leg assembly is symmetrically pivotally secured to extend from the lower support member.

One can readily appreciate the many fundamental distinguishing features of the instant invention from conventional tripod-type and unipod-type camera stands such as those distributed by Davis & Sanford; and taught in U.S. Pat. No. 4,196,881 issued 8 Apr. 1980 to Davidson; U.S. Pat. No. 6,454,228 B1 issued 24 Sep. 2002 to Bosnakovic, "*Portable Vertical Support*;" and U.S. Pat. No. 6,375,135 B1 issued 23 Apr. 2002 to Eason, et al. entitled "*High Strength Engineered Collapsible Tripod.*"

SUMMARY OF THE INVENTION

It is a primary object of this invention to provide a collapsible apparatus for supporting an article. While the applicant contemplates that the article can be of a myriad of shapes and sizes, and associated features of the apparatus will be accordingly sized and fabricated of material(s) having sufficient strength to support the article, shown here by way of example, are articles that are elongated in shape, many of which are used in an upright orientation—whether generally orthogonal to a ground surface or at another angle. Preferably, the apparatus has at least a first, second, and third leg assembly, an upper end of each leg assembly pivotally secured to extend from an upper support member in a generally symmetrical fashion. A lower end of each leg assembly is pivotally secured to extend from a lower support member (which may be in the shape of a collar). Each leg assembly has a unique hinge-fitting interconnecting a first and second elongated subassembly. The hinge-fitting may comprise a first and second extension pivotally enjoined, whereby each extension is interconnected with a respective elongated subassembly. An extension may be releasably interconnected using any suitable quick-release, or other, type mechanism; for example, an extension may be securely inserted within a tubular end-section of one of the elongated subassemblies, and then fastened in place with a spring-loaded detent located on the extension, a detent pin, a clip, an adhesive or gasket material around the extension, and so on.

Additional distinguishing features are many: Each elongated subassembly of the top-half of the apparatus may comprise a plurality of telescoping tubular sections adapted for interlock; likewise, each second (or, bottom-half) elongated subassembly may comprise a plurality of telescoping tubular sections adapted for interlock. Any suitable mechanism for interlocking the telescoping sections at a selected length may be employed, such as a detent pin fastener, with or without a pull-ring, etc. Depending upon requisite strength and overall size of the apparatus, additional elongated subassemblies may be interconnected within an apparatus joined with additional hinge-fittings. For example, a first elongated subassembly may be interconnected with a second elongated subassembly which is, in turn, interconnected with a third subassembly, and so on. The telescoping tubular sections of the first elongated subassembly may be sized for interchangeability with the telescoping tubular sections of the second, and other, elongated subassemblies of a leg assembly. While the length of interchangeable tubular sections need not be the same, where an interconnecting tubular section is intended to be interchangeable, and for maximal design flexibility, the cross-sectional shape/peripheral dimension(s) of tubular sections are preferably similar. For example, as one will appreciate, a set of telescoping tubular sections of one elongated subassembly shaped in the form of a square, rectangle, triangle, circle, oblong, or an irregular polygon (including shapes comprising any combination of straight edges and/or curvilinear sections) may be interchangeable with a set of telescoping tubular sections of another elongated subassembly if of the same shape and cross-sectional dimension.

The telescoping tubular sections are preferably made of a lightweight material having sufficient strength for supporting the particular intended article. A multitude of materials are contemplated for use according to the invention in connection with fabricating the leg assemblies, upper and lower support members, hinge-fittings—and components thereof—including resins, generally rigid plastics, alloys, metals, and so on. Material weight to strength is targeted on the lower side in the event portability of the apparatus is key, such as is the case where the apparatus is employed for uprighting elongated articles, or simply supporting any shaped article, on a more temporary basis. A wide variety of applications of an apparatus of the invention are contemplated within the spirit and scope of this technical disclosure—such as road construction signage and equipment; survey signage and equipment; barricade supports; building construction signage and equipment; uprighting holiday trees, shrubbery, and other trees; temporary fencing; indoor and outdoor lighting; nursery/garden and lawn equipment and signage; camping equipment; indoor and outdoor seating, tables and support for platforms; model rocket launch pads; military equipment; movie-filming and camera equipment; ice and snow removal equipment; and vehicle maintenance shops (automobile, aircraft, motorcycle, etc.)—to name a few.

As one will appreciate, further distinguishing features follow. For example, the upper support member may comprise a plurality of fork extensions to which upper ends of the leg assemblies are pivotally secured. Likewise, the lower support (collar) member may comprise a plurality of fork extensions to which lower ends of the leg assemblies are pivotally secured. The upper support member is preferably adapted to aid in the supporting of the article; for example, the upper support member may have an aperture for accepting an article that has an outer periphery that fits therewithin. Thus, the aperture will be sized to accept the periphery of the article. Likewise, the lower collar support may be adapted for accepting a lower-end of the article for placement on/in connection with a ground. For example, an aperture in the lower collar support is preferably sized to accept the lower-end of the article so that it may be positioned and stabilized atop, or embedded partially within, the ground surface. One may choose to employ an insert having an inner-aperture shaped to accept the outer perimeter of the article—this insert preferably shaped to releasably fit within an aperture of the upper support member. Further, a second insert may be employed having an inner-aperture shaped to accept an outer perimeter of the lower-end of the article—this second insert preferably shaped to releasably fit within an aperture in the lower collar support. Conveniently, both inserts may be identically dimensioned/shaped for interchangeability of use within the upper support member and the lower support collar. Likewise, an inner-aperture of each of the two inserts may be identically dimensioned, such as would be desirable where an elongated article has an outer periphery that does not substantially vary along its length—as is the case of a cylindrical article; or the inner-aperture of the two inserts may be of different shapes/dimensions—as would be the case where an elongated article has an outer periphery that varies in shape/size along its length.

The novel design of the hinge-fittings is such that each fitting permits a pivot range of rotation; preferably, this pivot range may be up to 90-degrees, up to 170-degrees, or just under 180-degrees. For example, label the vertical distance, $d_L$, between the lower collar support and the upper support member. Preferably the hinge-fitting design permits a pivot range of rotation such that the lower collar support may be placed on a ground, a vertical distance, $d_L$, from the upper support member that is greater than a vertical height, $h_{H-F}$, as measured between the upper support member and each hinge-fitting. Where the apparatus is configured such that the pivot range of the hinge-fitting is at just less than 180-degrees, the vertical distance, $d_L$, of this apparatus will preferably be greater than the sum of an overall length of the first elongated subassembly and an overall length of the second elongated subassembly (for reference, please see FIG. 8 hereof).

Additional features of the hinge-fittings include: a locking mechanism for holding the hinge-fitting in any one of a plurality of directions within its pivot range. The locking mechanism may take on a variety of suitable shapes including a series of recesses or through-holes and associated spring-loaded detent on a central pivot component, a detent pin, a clip, or other suitable mechanical 'stop' for locking the hinge-fitting in a selected rotation-direction. One or both extension of a hinge-fitting may further include an outwardly facing recess for accepting (a) a foothold adapted for stabilizing the hinge-fitting in connection with a ground, and/or (b) a fastener for use in connection with an anchor adapted for stabilizing the hinge-fitting in connection with a ground. The recess may be threaded to accept a foothold and/or fastener with a mated threading. By way of example: the foothold may comprise any suitable mechanism such as a stake, elastomeric foot, bolt, screw, pin, alloy footing, rolling caster with or without locking means, and so on; and the anchor may comprise a looped-end adapted to accept the fastener therethrough.

As one will appreciate, certain of the several unique features, and further unique combinations of features, as supported and contemplated hereby may provide a variety of advantages including versatility of use/application, portability, and so on.

(a) Design flexibility and versatility—basic structure is adaptable for supporting a wide variety of shapes/sizes; the apparatus may be set-up into a variety of configurations; the unique structure may be built with leg assemblies of few centimeters to several meters, for example.

(b) Compact, portable design is handy to set up, take down, move from place to place, as well as collapse for transport and/or storing; structure can be fabricated using lightweight plastics, metals/alloys, etc. (including the leg assemblies which can be built from tube stock of various cross-sectional shapes) that provide sufficient support in varying environments.

(c) The new stand may be sized for carrying and manipulation by an individual. These and other advantages of providing the new apparatus, will be appreciated by perusing the instant technical discussion, including the drawings, claims, and abstract, in light of drawbacks to existing technology that has been identified, or may be uncovered.

BRIEF DESCRIPTION OF THE DRAWINGS

For purposes of illustrating the innovative nature plus the flexibility of design and versatility of the preferred apparatus supported and disclosed hereby, the invention will be better appreciated by reviewing the accompanying drawings (in which like numerals, as included, designate like parts). One can appreciate the many features that distinguish the instant invention from traditional, known stands. The drawings have been included to communicate the unique features of the innovative apparatus of the invention by way of example, only, and are in no way intended to unduly limit the disclosure hereof.

DETAILED DESCRIPTION OF EMBODIMENTS DEPICTED IN DRAWINGS

Figure 1:
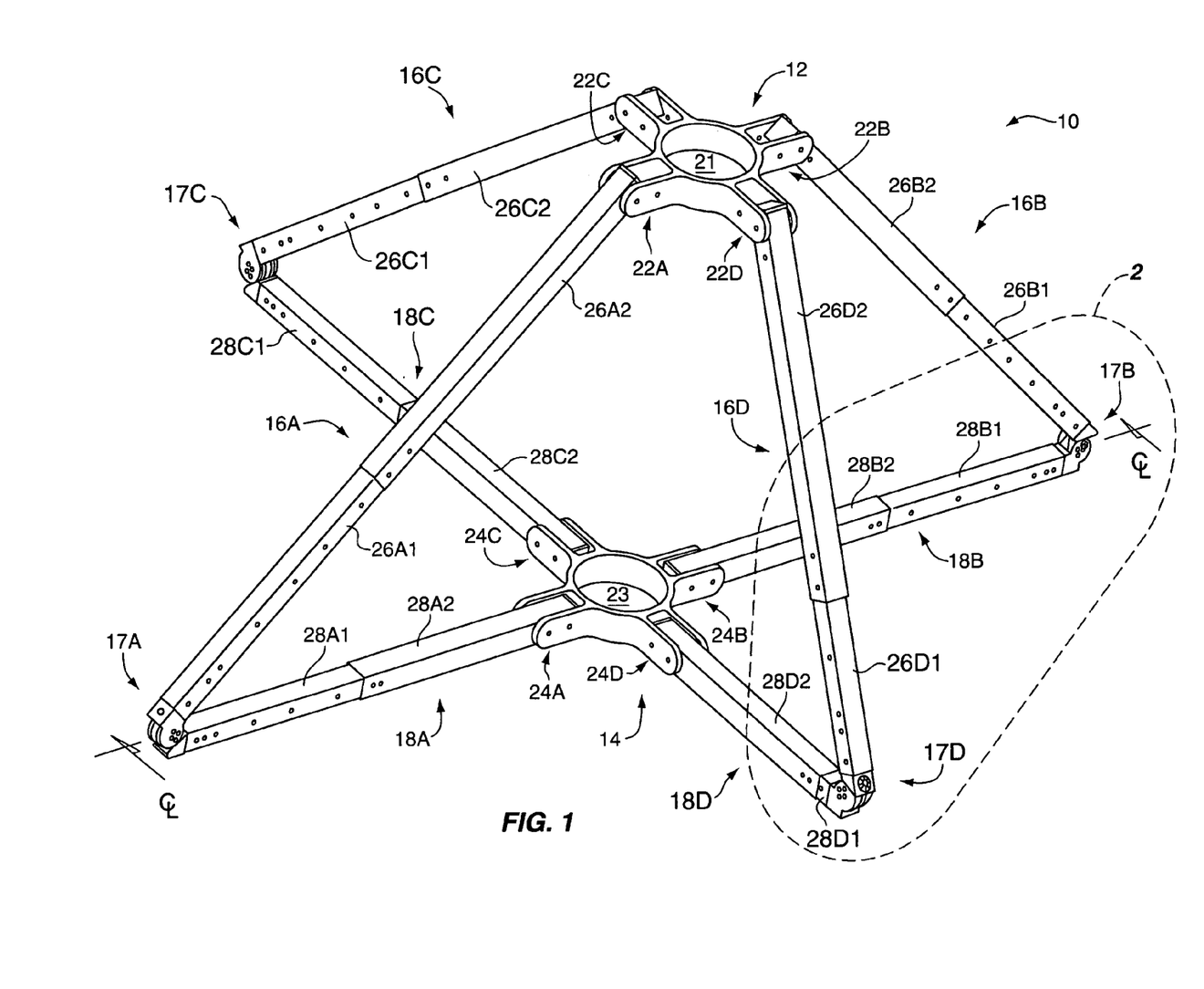
FIG. 1 is an isometric view of the features of a preferred apparatus 10 according to the invention with four leg assemblies, by way of example; illustrated are core, as well as further unique and distinguishing features for utilizing technology represented hereby.

In connection with discussing the features in FIG. 1, occasional reference will be made back-and-forth to other of the figures, especially, FIGS. 2–8, 10–11, and 17, which detail core, as well as further unique and distinguishing features of an apparatus of the invention 10—and further providing a pictorial demonstration of the flexibility of design of applicant's invention. As one can appreciate, the configuration of the collapsible apparatus 10 in FIG. 1 is especially suitable for a ground surface(s) that is substantially planar; however, the configurations in FIGS. 3, 5A–5B, and 8 provide configurations of the apparatus 10 adaptable to uneven ground, including holes, divots, inclines/declines, and so on, of a variety of shapes and sizes.

As mentioned, the article can be of a myriad of shapes and sizes, and associated features of the apparatus will be accordingly sized and fabricated of material(s) having sufficient strength to support the article. While articles that are generally elongated in shape are pictured herein (FIGS. 4, 12, and 13 at 20 and in FIG. 5B at 29 in phantom), this is by way of example only. Many of the elongated articles are intended for use in an upright orientation—whether generally orthogonal to a ground surface as shown in FIGS. 4, 5B, 12, and 13 or at some other angle. An elongated article may have an outer periphery that does not vary substantially along it's length—such as article 20—or an article that has a variable outer periphery—such as article 29—may be supported. Preferably, the apparatus has at least three leg assemblies, four are depicted in FIG. 1 et seq. Each leg assembly has a unique hinge-fitting (labeled 17A–17D) interconnecting 'upper' and 'lower' elongated subassemblies (labeled, respectively, 16A–16D and 18A–18D). An upper end of each leg assembly is pivotally secured to extend from an upper support member 12 in a generally symmetrical fashion. A lower end of each leg assembly is pivotally secured to extend from a lower support member (which may be in the shape of a collar, shown at 14). While any suitable mechanism may be employed, the upper support member 12 comprises four fork extensions (labeled 22A–22D) to which upper ends of the leg assemblies are pivotally secured. Likewise, the lower support (collar) member 14 comprises a plurality of fork extensions (labeled 24A–24D) to which lower ends of the leg assemblies are pivotally secured.

Figure 5A:
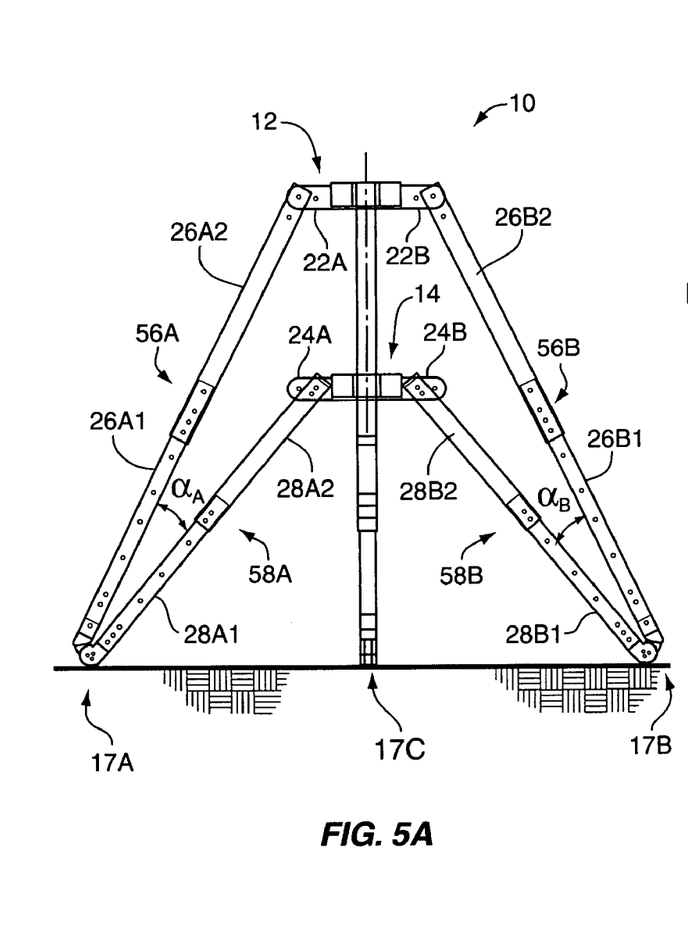
FIGS. 5A and 5B are sectional views taken along centerline $C_L$—$C_L$ of FIG. 1 (similar to FIG. 3), illustrating alternative configurations of apparatus 10.
Figure 5B:
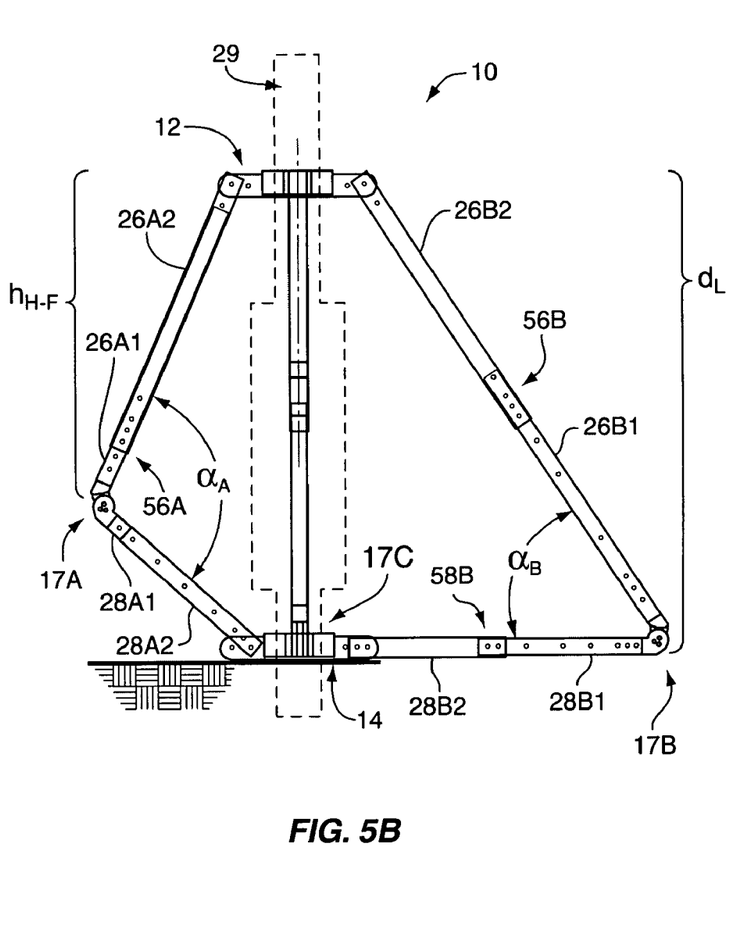

Each elongated subassembly 16A–16D is shown to comprise two telescoping tubular sections, labeled respectively 26A1, 26A2 through 26D1, 26D2 adapted for interlock (e.g., see FIGS. 5A–5B at 56A, 56B). Likewise, each bottom-half elongated subassembly 18A–18D is shown to have two telescoping tubular sections labeled respectively 28A1, 28A2 through 28D1, 28D2 adapted for interlock (e.g., see FIGS. 5A–5B at 58A, 58B). Any suitable mechanism for interlocking the telescoping sections at a selected length may be employed in connection with the locating holes depicted along the telescoping sections, such as a detent pin fastener, with or without a pull-ring, etc. It is critical that a selected overall length of each subassembly 16A–16D, 18A–18D be maintained when apparatus 10 is in use to support an article. As will be appreciated, the interlocking mechanism chosen need only be strong enough to support the particular weight/size of the article within anticipated environments (e.g., in gusty winds along a highway, in the event apparatus 10 is employed to support signage, the interlocking of telescoping sections will require greater strength than if the apparatus 10 is used to upright a floor lamp post within a dwelling).

Depending upon requisite strength and overall size of the apparatus, while not shown, one can appreciate that additional elongated subassemblies may be interconnected within an apparatus 10, 200 joined with additional hinge-fittings. For example, a first elongated subassembly (e.g., 16A–16D) may be interconnected with a second elongated subassembly (such as those respectively labeled 18A–18D) which is, in turn, interconnected with a third subassembly (structured and interconnected, once again, in a manner as those respectively depicted and labeled, e.g., 18A–18D), and so on, such that the second elongated subassembly is interposed between the first and third. The added subassembly may, similar to the first and third subassemblies, be comprised of more than one telescoping section, or only one section. As shown throughout, the telescoping tubular sections of the top-half elongated subassembly (16A–16D as well as 216A–216B in FIGS. 12 and 13) may be sized for interchangeability with the telescoping tubular sections of the second, and other, elongated subassemblies of a leg assembly. While the length of interchangeable tubular sections need not be the same (e.g., see FIGS. 12 and 13), for convenience and maximizing design flexibility and component interchangeability, the cross-sectional shape/peripheral dimension(s) of interconnecting tubular sections are preferably similar. For example, as one will appreciate, a set of telescoping tubular sections of one elongated subassembly (e.g., 16A–16D) that have a cross-section shaped in the form of a square, rectangle, triangle, circle, oblong, or an irregular polygon (including shapes comprising any combination of straight edges and/or curvilinear sections) may be interchangeable with a set of telescoping tubular sections of any other of the elongated subassemblies, if of the same shape and compatible cross-sectional dimensions.

Figures 2, 3:
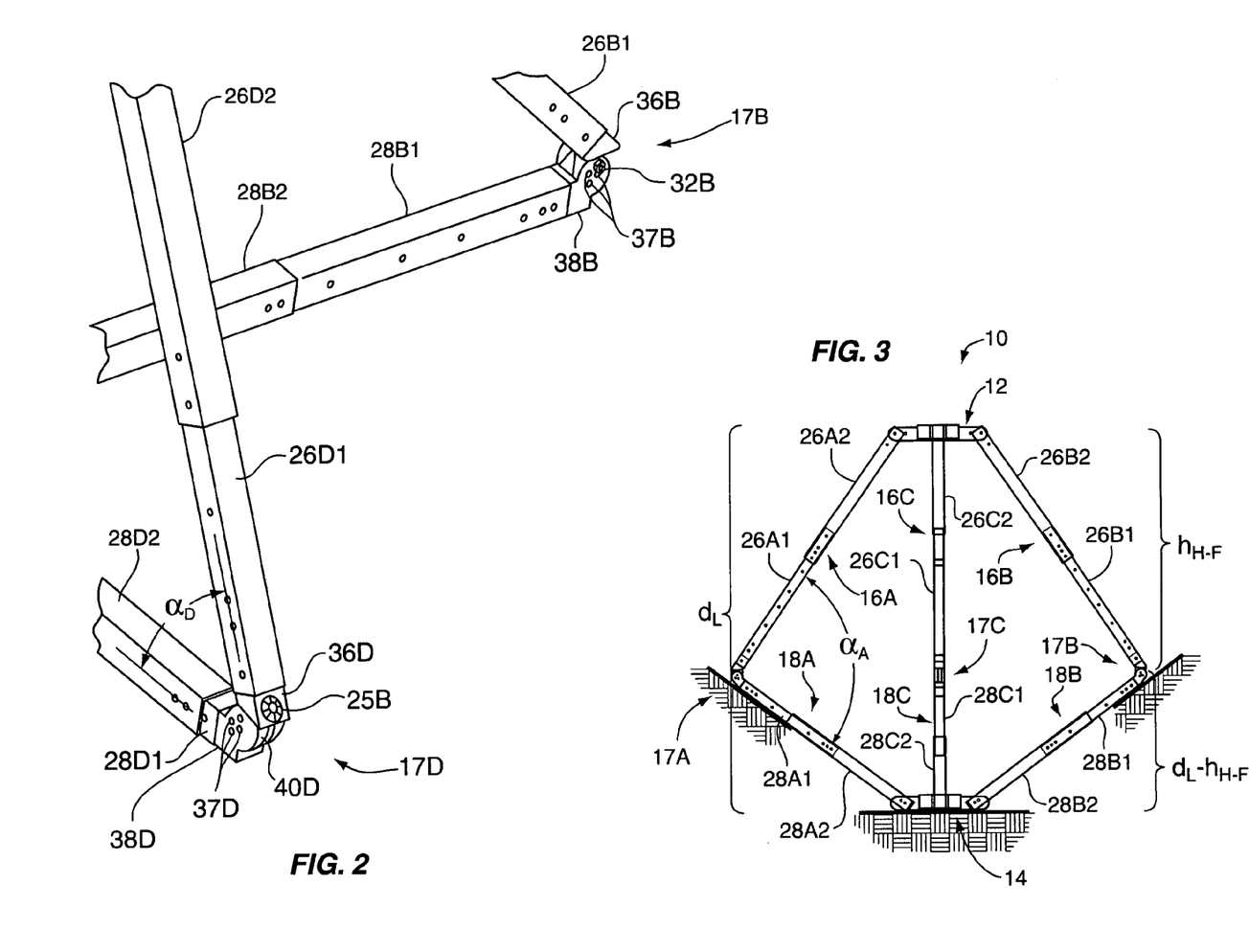
FIG. 2 is an enlarged isometric view of the area labeled 2 in the FIG. 1 isometric.
FIG. 3 is a sectional view taken along centerline $C_L$—$C_L$ of FIG. 1; however, the apparatus 10 is set-up in an alternative configuration than that depicted in FIG. 1.

FIG. 2 is an enlarged isometric view of the area labeled 2 in the FIG. 1 isometric. As shown here, and also detailed in FIG. 4, hinge-fittings (17A–17D) may each comprise a first and second extension (36A–36D and 38A–38D) pivotally enjoined (40A–40D), whereby each extension is interconnected with a respective elongated subassembly; e.g., as pictured in FIG. 2 extension 36D is interconnected with section 26D1 and extension 38D is paired with section 28D1, likewise as pictured in FIG. 4 extension 36A is interconnected with section 26A1 and extension 38A is paired with section 28A1. An extension may be releasably interconnected with a section of an elongated subassembly using any suitable quick-release, or other, type mechanism. For example, as depicted throughout the figures, an extension may be securely inserted within a tubular end-section of one of the elongated subassemblies, and then fastened in place with suitable mechanism, such as a spring-loaded detent located on the extension, a detent pin, a clip, an adhesive or gasket material around the extension, and so on.

Figure 17:
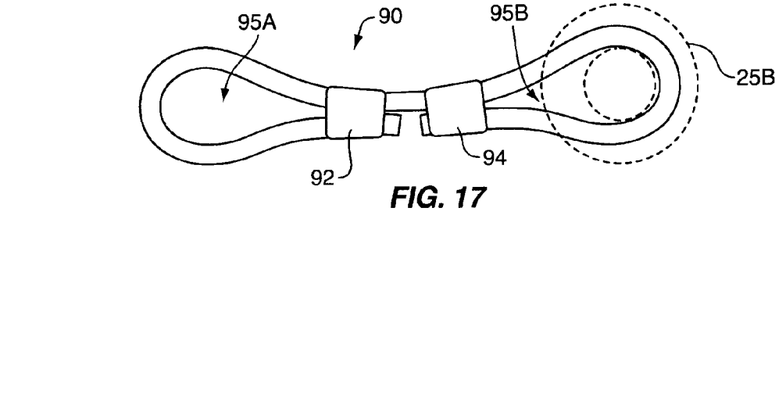
FIG. 17 is a schematic top plan view of an anchor 90 suitable for use according to the invention to further stabilize each hinge-fitting to a ground.

Turn for a moment to the schematic top plan view in FIG. 17 of an example of an anchor 90 suitable for use to further stabilize any of the hinge-fittings to a ground. Anchor 90 may be fastened with bolt, screw, pin, alloy footing, or other suitable fastener (e.g., 25B in FIG. 2 and as shown in phantom in FIG. 17) to any of the hinge-fittings (17A–17D, and 215/215" as labeled in FIGS. 12–14). Recesses/indents 46A, 46B (FIGS. 4, 7) and 248B (FIG. 14) are preferably sized and threaded, if necessary, to accept any particular fastener (such as 25B) selected for use in connection with the anchor. The other looped-end 95A of anchor 90 will likewise accept a suitable fastener that can be pounded into the ground surface, into an adjoining apparatus, or elsewhere to stabilize the respective hinge-fitting. While anchor 90 is depicted as a double-loop of sturdy, flexible metal, nylon, fiber, etc., cording (suitably secured with a pinched-collar at 92, 94), any similar dog-bone or other shape may be used that is adaptable to accept a fastener to the hinge-fitting and to a stabilizing location (ground/flooring, another apparatus, etc.).

FIG. 3 is a sectional view taken along centerline $C_L$—$C_L$ of FIG. 1, however, the apparatus 10 is set-up in an alternative configuration than that depicted in FIG. 1. A wide variety of applications of an apparatus of the invention are contemplated within the spirit and scope of this technical disclosure—such as road construction signage and equipment; survey signage and equipment; barricade supports; building construction signage and equipment; uprighting holiday trees, shrubbery, and other trees; temporary fencing; indoor and outdoor lighting; nursery/garden and lawn equipment and signage; camping equipment; indoor and outdoor seating, tables and support for platforms; model rocket launch pads; military equipment; movie-filming and camera equipment; ice and snow removal equipment; and vehicle maintenance shops (automobile, aircraft, motorcycle, etc.)—to name a few. In FIG. 3, lower support collar 14 rests on a ground surface, as do hinge-fittings 17A–17C such as where apparatus 10 is placed within a hole within a ground surface. One can see that leg subassemblies 16A, 16B, 16C are comprised respectively of sections labeled 26A1–26A2, 26B1–26B2, 26C1–26C2 and leg subassemblies 18A, 18B, 18C are comprised respectively of sections labeled 28A1–28A2, 28B1–28B2, 28C1–28C2 in a manner that results in a nearly 90-degree angle at the hinge-fittings—here for simplicity only one hinge-fitting angle is labeled, $\alpha_A$.

The novel design of the hinge-fittings permits a pivot range of rotation; throughout the figures, this range is illustrated by picturing apparatus 10 in various configurations whereby the rotation angle for any configuration is labeled $\alpha_A$–$\alpha_D$, to coincide with the labeling of hinge-fittings 17A–17D. This pivot range may be up to 90-degrees, up to 170-degrees, just under 180-degrees, and so on. Labeled for reference in the configurations in FIGS. 3, 5B, 8, 12 are the following: vertical distance, $d_L$, as measured between a lower collar support 14, 214 and an upper support member 12, 212; vertical height, $h_{H-F}$, as measured between an upper support member 12, 212 and a respective one of the hinge-fittings 17A–17D; and the difference between these, or $d_L$, $-h_{H-F}$. Unlike conventional tripod-type stands, the apparatus of the invention (shown throughout at 10, 200, and particularly FIG. 3) has hinge-fittings designed to permit a pivot range of rotation such that the lower collar support may be placed on a ground, a vertical distance, $d_L$, that is greater than the vertical height, $h_{H-F}$, as measured between the upper support member and each hinge-fitting. Where the apparatus is configured such that the pivot range of the hinge-fitting is at just less than 180-degrees (for reference see FIG. 8, where hinge-fittings 17A, 17B have rotation angles respectively labeled $\alpha_A$ and $\alpha_B$), the vertical distance, $d_L$, of apparatus 10 is greater than the sum of an overall length, $L_1$, of the subassembly comprised of sections 26B1, 26B2 and an overall length, $L_2$, of the subassembly comprised of sections 28B1, 28B2. As one can see, the sections of each elongated subassembly have been interlocked to achieve the respective overall lengths shown, $L_1$, $L_1$.

Figure 4:
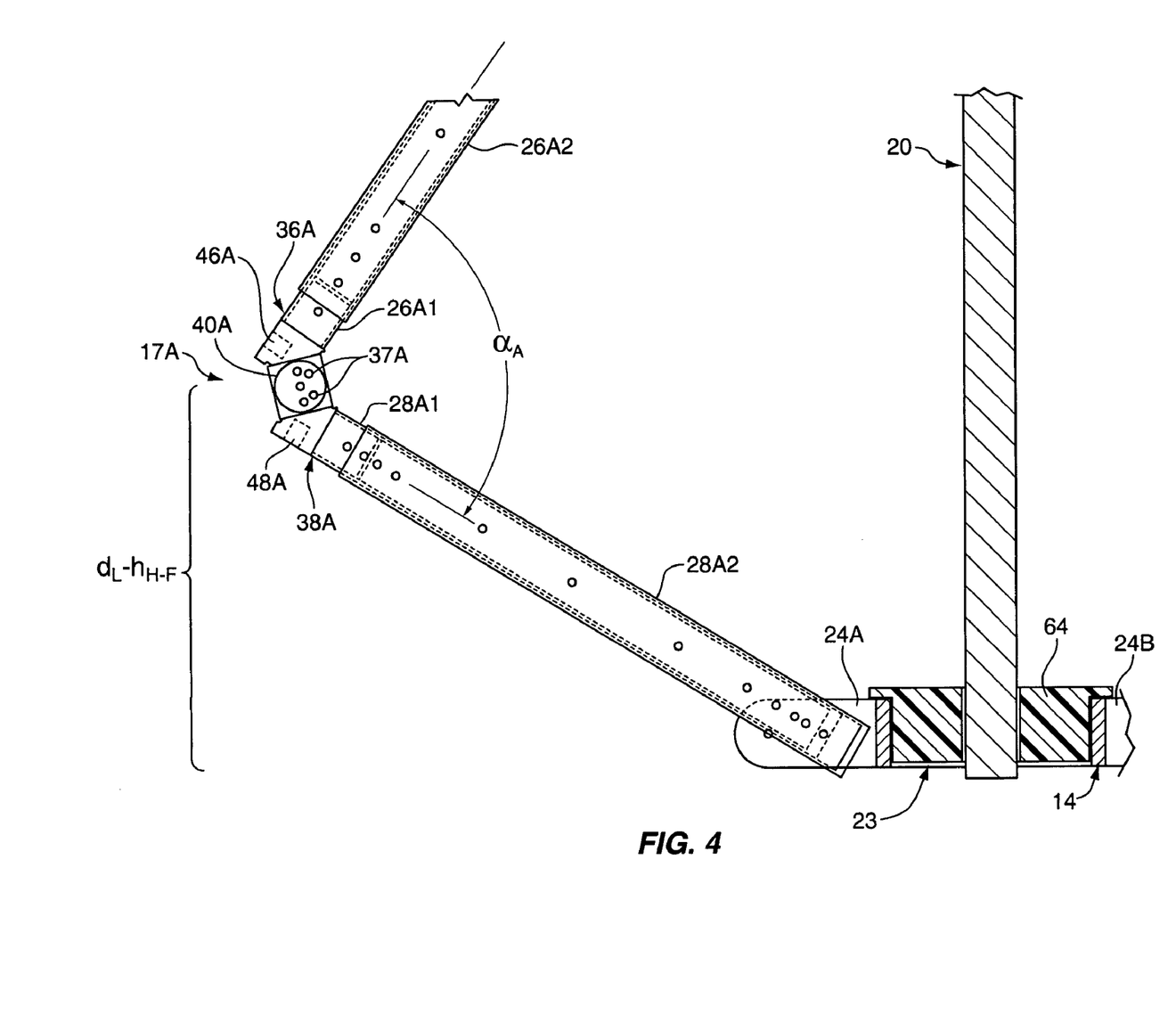
FIG. 4 is an enlarged partial sectional view of a hinge-fitting labeled 17A in a configuration of the apparatus 10 similar that depicted in FIG. 5B; included also by way of example is an article 20 of an elongated shape oriented by an insert 64 (see FIG. 10).
Figures 9, 10, 11:
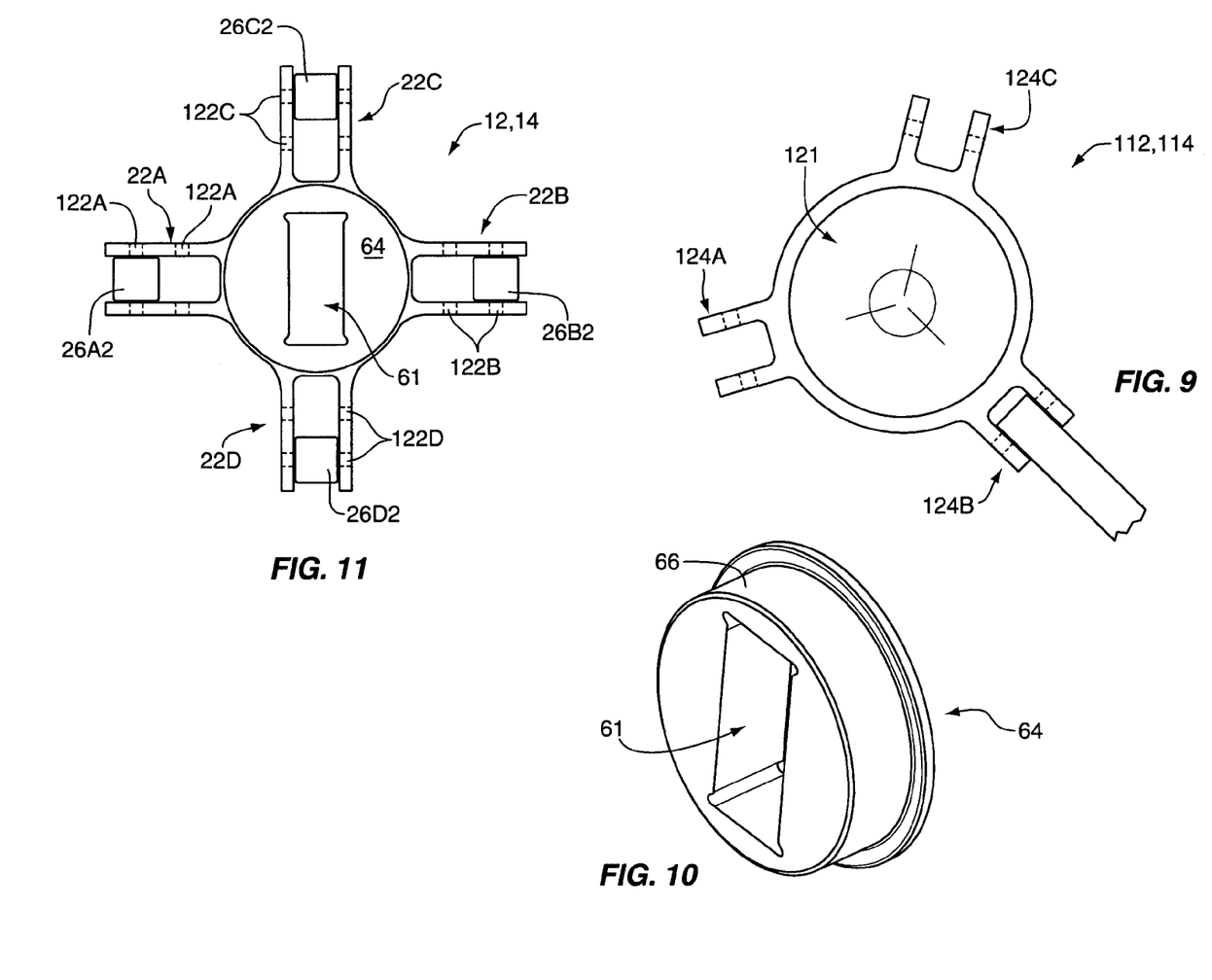
FIG. 9 is a top plan view of a support member that can function as an upper support and/or lower collar support member 112, 114 and may be used as an alternative to those shown in FIG. 1 at 12, 14 for an apparatus having three leg assemblies.
FIG. 10 is an isometric view of an insert 64 for use in connection with either, or both, upper and lower support members 12, 14 and 112, 114 to aid in support of an article.
FIG. 11 is a top plan view of a support member that can function as an upper or lower support 12, 14 into which an insert, such as 64 in FIG. 10, has been positioned.

Returning to the enlarged partial sectional view in FIG. 4, hinge-fitting 17A has an angled $\alpha_A$ set up a configuration similar that depicted in FIG. 5B, in such a way as to aid in supporting article 20 (elongated in shape, for example) oriented by an insert 64—details of which are shown in FIGS. 10 and 11 (as inserted into a support member 12, 14). As mentioned, hinge-fitting 17A comprises extensions 36A, 38A pivotally enjoined 40A whereby each extension is interconnected with a respective elongated subassembly; e.g., extension 36A is interconnected with section 26A1 and extension 38A is paired with section 28A1. An extension may be releasably interconnected with a section of an elongated subassembly using any suitable quick-release, or other, type mechanism. Hinge-fitting 17A includes a locking mechanism 37A for holding the hinge-fitting in any one of a plurality of directions within its pivot range. The locking mechanism may take on a variety of suitable shapes including a series of recesses or through-holes, such as those shown at 37A, and one or more associated spring-loaded detent(s) on a central pivot component, a detent pin, a clip, or other suitable mechanical 'stop' for locking the hinge-fitting in a selected rotation-direction (e.g., FIG. 2 at 32B and FIG. 7 at 32C). One or both of extension 36A, 38A of a hinge-fitting 17A may further include an outwardly facing recess, respectively labeled 46A, 48A for accepting (a) a foothold adapted for stabilizing the hinge-fitting in connection with a ground, such as is shown by way of example at 225B, FIG. 14, and/or (b) a fastener for use in connection with an anchor adapted for stabilizing the hinge-fitting in connection with a ground, such as is shown by way of example in FIG. 17 at 90. The recess may be threaded to accept a foothold and/or fastener with a mated threading (e.g., FIG. 14). By way of example: the foothold may comprise any suitable mechanism such as a stake, elastomeric foot, bolt, screw, pin, alloy footing, rolling caster with or without locking means, caster mechanism, and so on; and the anchor may comprise one or more looped-end (e.g., FIG. 17 95A, 95B) adapted to accept the fastener (e.g., FIGS. 2, 7, 17 at 25B) therethrough.

Figure 6:
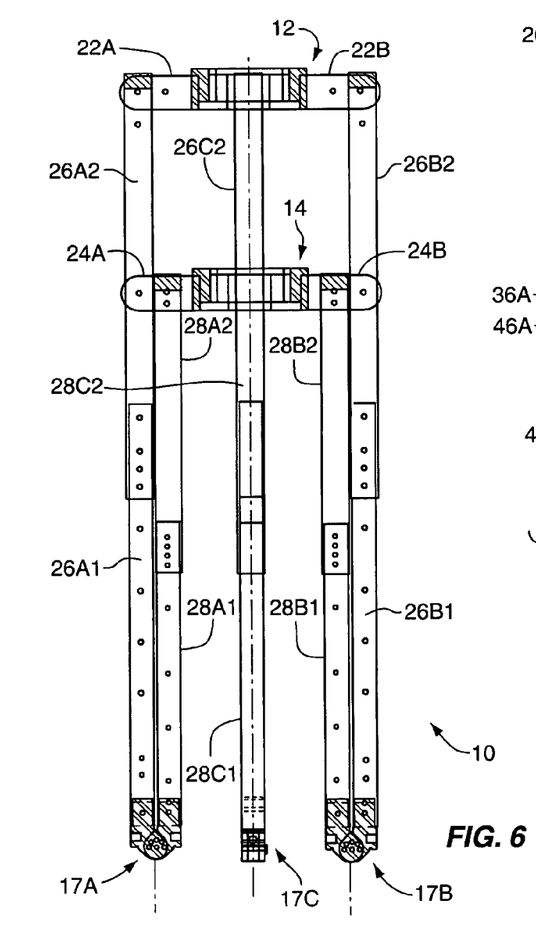
FIG. 6 is a sectional view taken along centerline $C_L$—$C_L$ of FIG. 1 illustrating an alternative compact configuration used to facilitate transport and storage of apparatus 10.
Figure 7:
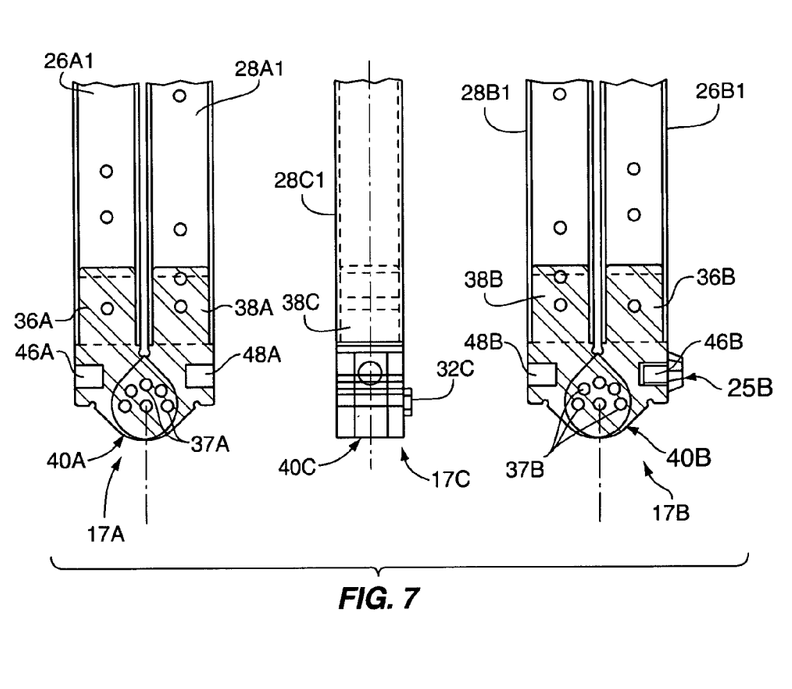
FIG. 7 is an enlarged partial sectional view of the hinge-fittings 17A, 17B, 17C of FIG. 6 depicting further unique details thereof.
Figure 8:
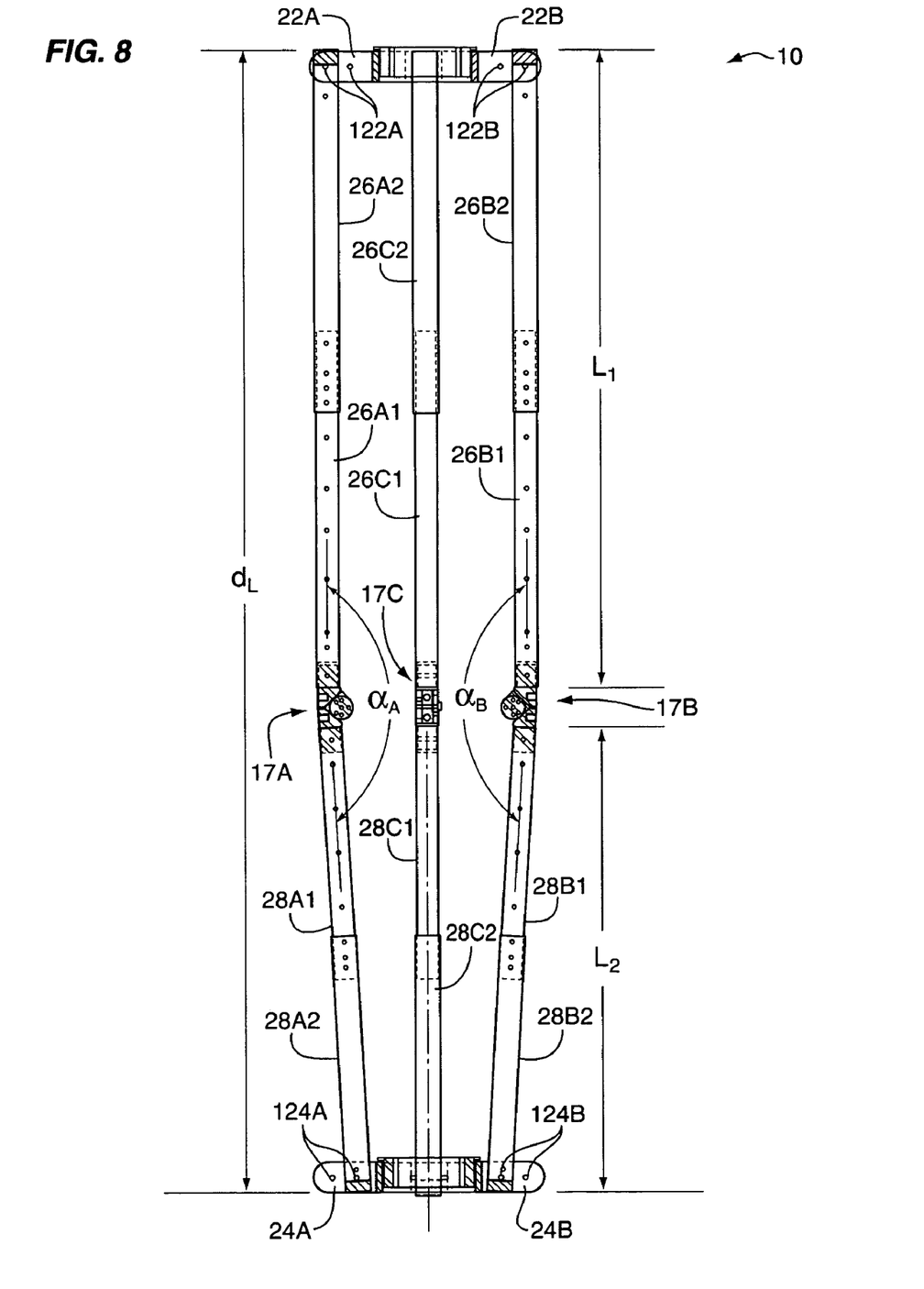
FIG. 8 is a sectional view taken along centerline $C_L$—$C_L$ of FIG. 1 illustrating an alternative extended configuration of apparatus 10 with hinge-fittings 17A, 17B, 17C in an 'open' extended position.

Next, the sectional view taken along a centerline $C_L$—$C_L$ of FIG. 1 in FIGS. 5A–5B and 6–8 will be referred to collectively as alternative configurations of apparatus 10. While various features depicted in FIGS. 5A–5B and 6–8 have already been referenced, note that each configuration has an angle $\alpha_A$ at hinge-fitting 17A that is different, illustrating a full range of possibilities: In FIG. 5A, $\alpha_A$ is an acute angle; in FIG. 5B the leg subassemblies (made of paired sections 26A1, 26A2 and 28A1, 28A2) are nearly orthogonal, thus, $\alpha_A$ is nearly 90-degrees; FIG. 6 is a preferred compact alternative collapsed configuration which facilitates transport and storage, where $\alpha_A$ is effectively 0-degrees (not labeled for simplicity); FIG. 7 details features of the FIG. 6 hinge-fittings 17A, 17B, 17C; and FIG. 8 illustrates an alternative configuration whereby hinge-fittings 17A, 17B, 17C are in an 'open' extended position with $\alpha_A$ just under 180-degrees. If the article is elongated in shape, such as is shown at 29 in FIG. 5B, upper support member 12 preferably has an aperture sized to accept an upper-end of the article 29. Lower collar support 14 will likewise have an aperture to accept a lower-end of the article. Article 29 has an outer periphery, or cross-section, that varies along its length. The apertures in upper and lower support members 12, 14 may be of the same outer diameter or different—the aperture shapes will depend upon the periphery size and shape of the upper- and lower-ends of article 29. For example, to support a 2"×4" piece of wood using apparatus 10, the aperture must be large enough for the wood to fit through—either greater than 4" round or a rectangle that is greater than 2"×4". Refer also to FIGS. 9–11: an insert 64 having a rectangular inner-aperture 61 may be employed with upper and lower support members 12, 14 to further aid in supporting the 2"×4" piece of wood.

The compact, collapsed configuration depicted in FIGS. 6 and 7 further illustrates the flexibility in design and unique structure of the invention. From the position of the apparatus 10 as shown in FIG. 1, whether or not leg subassembly sections are 'unlocked' at 56A–56D and 58A–58D and shortened, the leg assemblies are moved through the configuration in FIG. 5A (thus, making hinge-fitting angles $\alpha_A$—$\alpha_A$ smaller) until leg subassembly sections 26A2–26D2 fit into the outer part of fork extensions 24A–24D of lower support 14. Fork extensions 24A–24D can be sized so the fit is tight (e.g., a snap-fit) to aid in holding the apparatus together in transport and storage. The enlarged view in FIG. 7 provides, once again, an opportunity to appreciate details at hinge-fittings 17A–17C: the extensions (36A–36D and 38A–38D) are pivotally enjoined (40A–40D), whereby each extension is interconnected with a respective elongated subassembly; e.g., as pictured extension 36A is interconnected with section 26A1, extension 38A is paired with section 28A1, likewise extension 36B is interconnected with section 26B1 and extension 38B is paired with section 28B1, and so on.

As mentioned, the telescoping tubular sections are preferably made of a lightweight material having sufficient strength for supporting the particular intended article. A multitude of materials are contemplated for use according to the invention in connection with fabricating the leg assemblies, upper and lower support members, hinge-fittings—and components thereof—including resins, generally rigid plastics, alloys, and metals. An alloy includes any combination of elements typically having metallic properties; and resins are any of a class of solid or semisolid organic products of natural or synthetic origin with no definite melting point, generally of high molecular weight—typically a polymer. In any case and as one can appreciate, many well known manufacturing techniques exist (such as extruding, pulling, molding, machining, cutting, etc.) that are suitable for use in fabricating the telescoping sections, upper and lower support members, and hinge-fitting components. Material weight-to-strength ratio is targeted on the lower side in the event portability of the apparatus is key, such as is the case where the apparatus is employed for uprighting elongated articles, or simply supporting any shaped article, on a more temporary basis. By way of example only, an apparatus may be made using the following materials: telescoping sections extruded from square alloy tubing such as 6061 or 6063 aluminum (6061 is more difficult to extrude, with 6063 being specifically designed for the extrusion process); other components (e.g., upper and lower support members, hinge-fitting assemblies) may be machined or molded of HDPE (High Density PolyEthylene); fasteners may be off-the-shelf standard zinc plated 3/16" bolts and pins made from off-the-shelf alloys found in local hardware stores; and anchor mechanism may be fabricated from 1/8" plated steel cable swaged at both ends to form tie-down loops (sized to accept fasteners).

FIG. 9 is a top plan view of a support member that can function as an upper support and/or lower collar support member 112, 114 and may be used as an alternative to those shown in FIG. 1 at 12, 14 for an apparatus having three leg assemblies. Once again, the article may be of a variety of shapes and sizes; respective support members (12, 14, 212, 214) will be shaped and sized accordingly. FIG. 10 is an isometric view of an insert 64 for use in connection with either, or both, upper and lower support members 12, 14 and 112, 114 to aid in support of an article. FIG. 11 is a top plan view of a support member that can function as an upper or lower collar support member 12, 14 into which an insert, such as that shown at 64 in FIG. 10, has been positioned. As mentioned, upper support member 12, 212 is preferably adapted to aid in supporting the article (e.g., 20, 29). Where the article shape permits (e.g., elongated article), the lower collar support may be adapted for accepting a lower-end of the article (20, 29) for placement on/in connection with a ground. While not critical, each upper and lower member 12, 14 and 212, 214 is shown with an aperture for accepting an article that has an outer periphery that fits within the aperture. For example, upper and lower support members 12, 14 are shown with apertures labeled throughout as 21, 23 and support member 212 has an aperture 121. Rather than being elongated in shape, an article may instead have an extension/protrusion that fits within the aperture. An aperture 23 in the lower collar support 14 is preferably sized to accept the lower-end of the article so that it may be positioned and stabilized atop, or embedded partially within, a ground surface.

Figure 12:
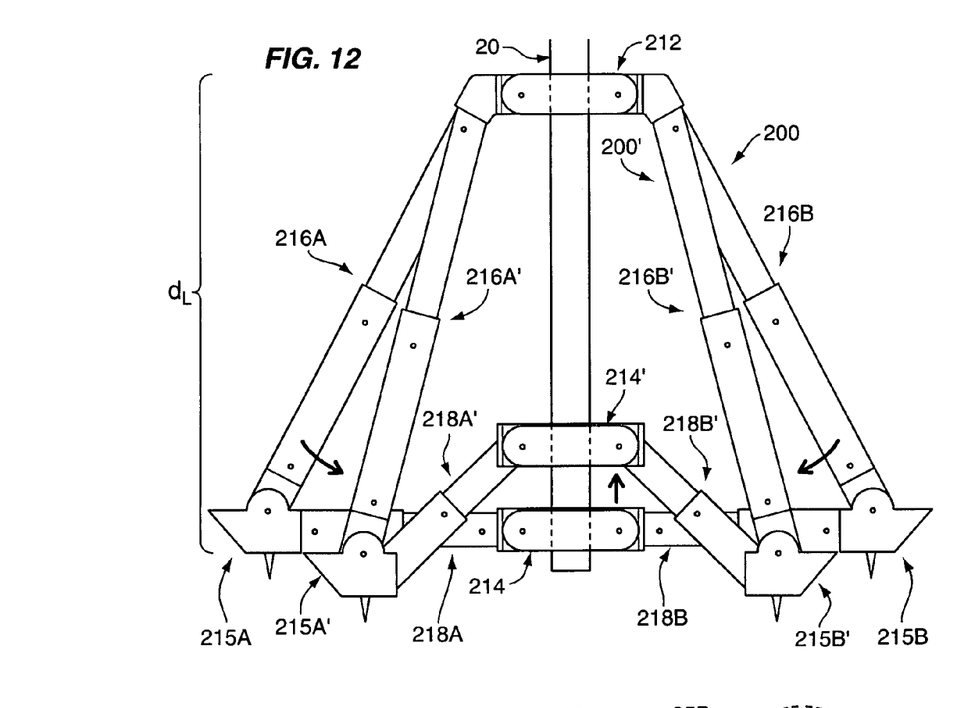
FIGS. 12 and 13 are side plan views of an alternative apparatus 200—having three, four or more leg assemblies within which an article 20 has been placed—in a open configuration at 200, in an intermediate configuration 200' through which the apparatus passes prior to the compact configuration depicted in FIG. 13 at 200" (for storage and transport).
Figure 13:
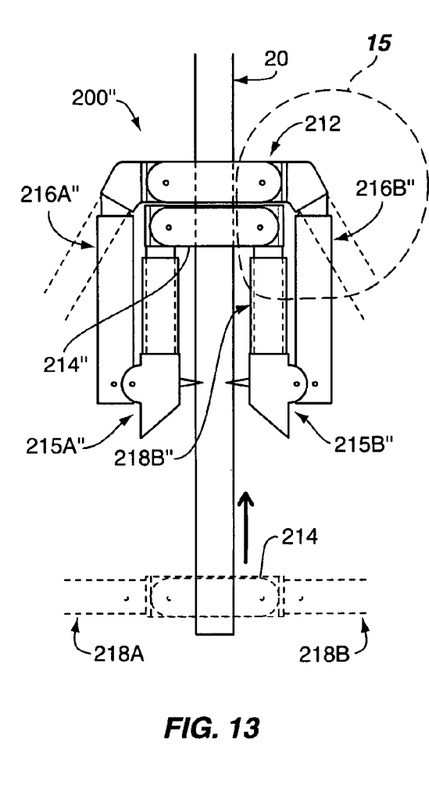

An aperture 21, 23, 121 may itself be sized to accept the periphery of the article, or sized to accept an insert (such as that at 64). If an insert having an inner-aperture shaped to accept the outer perimeter of the article is employed, this insert is preferably sized and shaped 66 to releasably fit within the respective aperture (e.g., 21, 23, 121) of the support member. As shown by way of example in FIG. 10, insert 64 has a rectangular inner-aperture 61—however, a multitude of shapes are contemplated. Once again, inner-aperture 61 is sized to coordinate with the outer periphery of the article. As mentioned, an insert may be employed having an inner-aperture shaped to accept an outer perimeter of the lower-end of the article—this second insert preferably shaped to releasably fit within an aperture in the lower collar support 14, 214. Conveniently, both inserts may be identically dimensioned/shaped for interchangeability of use within the upper support member 12, 212 and the lower support collar 14, 214. Likewise, an inner-aperture of each of the two inserts may be identically dimensioned, such as would be desirable where an elongated article has an outer periphery that does not substantially vary along its length—as is the case of a cylindrical article (FIGS. 12, 13). Or, the inner-aperture of the two inserts may be shaped/dimensioned differently—as would be the case where an elongated article has an outer periphery that varies in shape/size along its length.

Figure 14:
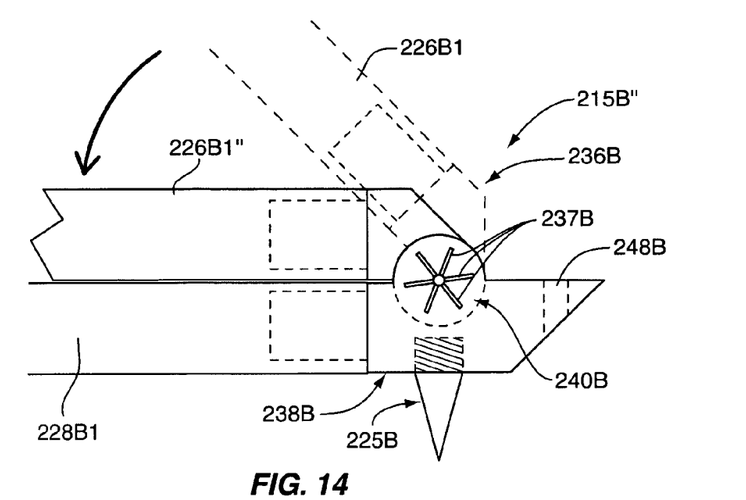
FIG. 14 is an enlarged detailed schematic representing the hinge-fitting 215B" of FIG. 13 in its compact configuration—also shown, in phantom, is an open configuration.

Turning next to the side plan schematic views of an alternative apparatus labeled 200 in FIGS. 12 and 13, one can appreciate that apparatus 200 (in an intermediate configuration at 200' and a compact, collapsed configuration at 200") may likewise have three, four or more leg assemblies within which an article 20 may been placed. In connection with the discussion that follows, please refer also to the enlarged schematic sectional, FIG. 14, representing the hinge-fitting 215B" of FIG. 13 in its compact configuration—with its open configuration, in phantom (section 226B1)—which details features of an alternative hinge-fitting mechanism 215B" in two positions: (1) a set-up position, and (2) a collapsed configuration, i.e., similar to FIG. 6 where $\alpha_A$ is effectively 0-degrees (not labeled for simplicity). The intermediate configuration 200' is that through which the apparatus will pass prior to the compact configuration depicted in FIG. 13 at 200" which facilitates transport and storage. Arrows have been included to indicate how the leg subassemblies viewable in this side plan (216A–216B, 218A–218B) and lower support member 214 can be moved from an initial set-up configuration (at 200). By moving leg subassemblies (such as those in view here at 216A–216B, 218A–218B)—which in turn moves hinge-fitting mechanisms 215A–215B inwardly (215A'–215B') as well as lower support member 214 in an upwardly direction through a position 214' an into position 214"—an initial set-up configuration 200 can be transformed into two other configurations respectively labeled 200' and 200".

Figure 15:
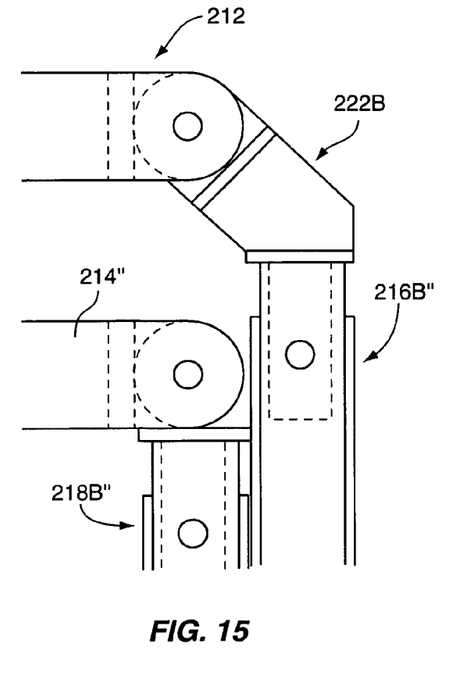
FIG. 15 is an enlarged detailed partial schematic representing the upper right-hand corner area (labeled 15) of the apparatus 200" depicted in FIG. 13.

As mentioned, in FIG. 13, apparatus 200" is in a collapsed configuration to facilitate transport and storage—an arrow has been added to indicate how the lower support 214 (in phantom, here simply for reference) moves upwardly to location 214" while telescoping leg assemblies 218A–218B (also in phantom) are pushed together to end up at 218A"–218B" (see also FIG. 15). Two leg assemblies are viewable in FIGS. 12 and 13 with a respective one of the hinge-fitting mechanisms 215A–215B interposed between leg subassembly section pairs 216A, 218A and 216B, 218B. An adjustable telescoping feature is included with each subassembly: by way of example as shown, subassemblies 216A–216B and 218A–218B each have hollow telescoping sections (not labeled here; see for reference FIGS. 2–8). One may employ as many leg assemblies as will fit in a symmetrical fashion around upper and lower support members 212, 214 for interconnection thereof. Examples of suitable alternative pivot mechanisms of the upper member 212 have been labeled 222B and 322B as shown in more detail in FIGS. 15 and 16—all of which pivotally extend from member 212, 312 which may way of example be toroidal in shape. As can be better appreciated in connection with the enlarged partial sectional labeled FIG. 14, not only does each hinge-fitting mechanism 215A, 215B et seq., have a pivot feature interposed between extensions 236B and 238B, but each have been designed to also provide an appropriate level of stabilization depending upon use of the apparatus 200, 200', 200". As shown, for example, stakes (labeled 225B in FIG. 14) can be pushed into the ground, or rubber, metal, wooden, etc., disks/feet, rolling casters, and so on, can be removeably secured (screw, quick-release, or other fastener) or bolted to, machined or molded into the hinge-fitting mechanism 215" (into a recess provided in extension 238B, as shown).

Figure 16:
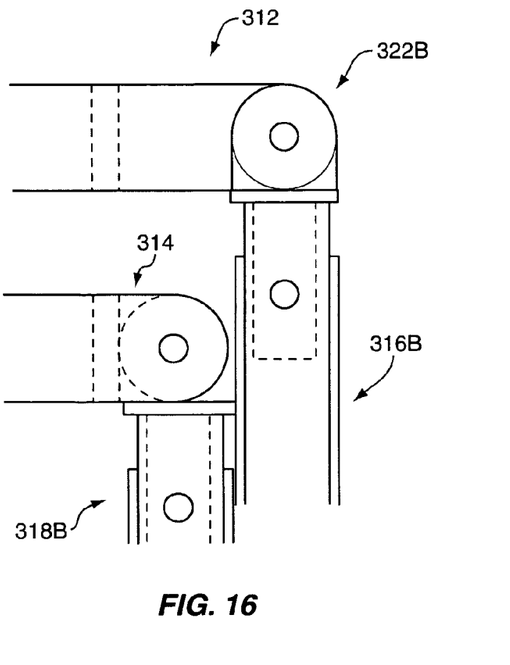
FIG. 16 is a detailed partial schematic representing alternative structure(s) to the components of FIG. 15 for carrying out the invention.

The enlarged schematic representations in FIG. 15 (upper right-hand corner area, labeled 15, of the apparatus 200" in FIG. 13) and FIG. 16 detail alternative pivot mechanisms for securing ends of leg assemblies to the upper support member—shown for reference, here, in a collapsed configuration for facilitating transport and storage of an apparatus of the invention. Just as in FIG. 15, FIG. 16 has an upper support member 312 and lower support member 314, pivotally secured thereto are leg subassemblies 316B and 318B using a pivot mechanism labeled 322B.

While certain representative embodiments and details have been shown for the purpose of illustrating the invention, those skilled in the art will readily appreciate that various modifications, whether specifically or expressly identified herein, may be made to any of the representative embodiments without departing from the novel teachings or scope of this technical disclosure. Accordingly, all such modifications are contemplated and intended to be included within the scope of the claims. Although the commonly employed preamble phrase "comprising the steps of" may be used herein in a method claim, applicants do not intend to invoke 35 U.S.C. §112 ¶6. Furthermore, in any claim that is filed herewith or hereafter, any means-plus-function clauses used, or later found to be present, are intended to cover at least all structure(s) described herein as performing the recited function and not only structural equivalents but also equivalent structures.

What is claimed is:

1. A collapsible apparatus for supporting an article, the apparatus comprising:
  (a) a first, second, and third leg assembly;
  (b) an upper end of each said leg assembly pivotally secured to extend from an upper support member in a generally symmetrical fashion;
  (c) a lower end of each said leg assembly pivotally secured to extend from a lower collar support;
  (d) each said leg assembly comprising a hinge-fitting interconnecting a first and second elongated subassembly, said hinge-fitting adapted to permit at least a pivot range of 170-degrees of rotation and said hinge-fitting to comprise a locking mechanism for holding said hinge-fitting in a rotation-direction; and (e) said upper support member adapted to aid in the supporting of the article.

2. The apparatus of claim 1 in use with the article and wherein:
(a) the article is elongated in shape;
(b) each said first elongated subassembly is variable in overall length and comprises a plurality of telescoping tubular sections adapted for interlock at a selected length;
(c) said upper support member comprises an aperture for accepting the elongated article; and
(d) said lower collar support is adapted for accepting a lower-end of the article for placement on a ground.

3. The apparatus of claim 2 further comprising an insert having an inner-aperture shaped to accept an outer perimeter of the article, said insert shaped to releasably fit within said aperture of said upper support member.

4. The apparatus of claim 1 wherein:
said locking mechanism is further adapted for holding said hinge-fitting any one of a plurality of said rotation-directions within said pivot range.

5. The apparatus of claim 4 wherein:
(a) each said hinge-fitting further comprises a first and second extension pivotally enjoined;
(b) each said first and second extensions releasably interconnected with a respective one of said first and second elongated subassemblies; and
(c) said locking mechanism comprises a through-hole and a detent pin.

6. The apparatus of claim 4 wherein:
(a) each said hinge-fitting further comprises a first and second extension pivotally enjoined, said pivot range is further adapted to permit up to just less than 180-degrees of rotation, and said lower collar support is a vertical distance, $d_L$, from said upper support member; and
(b) with said pivot range at said just less than 180-degrees, said vertical distance, $d_L$, is greater than the sum of an overall length of said first elongated subassembly and an overall length of said second elongated subassembly.

7. The apparatus of claim 1 wherein:
(a) each said first elongated subassembly is variable in overall length;
(b) said upper support member comprises a plurality of fork extensions to which said upper ends of said leg assemblies are pivotally secured; and
(c) said lower collar support comprises a plurality of fork extensions to which said lower ends of said leg assemblies are pivotally secured.

8. The apparatus of claim 7 wherein:
(a) a pin inserted through both a through-hole in each said fork extension of said upper support member and through a respective one of said upper ends provides said pivotal securing thereof; and
(b) said lower collar support is adapted for accepting a lower-end of the article for placement on a ground.

9. The apparatus of claim 1 wherein:
(a) said upper support member comprises a plurality of fork extensions to which said upper ends of said leg assemblies are pivotally secured;
(b) each said first elongated subassembly is variable in overall length and comprises a plurality of telescoping tubular sections adapted for interlock; and
(c) each said second elongated subassembly is variable in overall length and comprises a plurality of telescoping tubular sections adapted for interlock; and (d) said telescoping tubular sections of said first elongated subassembly are sized for interchangeability with said telescoping tubular sections of said second elongated subassembly.

10. The apparatus of claim 9 wherein:
(a) each said telescoping tubular section has been interlocked at a selected length; and
(b) each said hinge-fitting further comprises: a first and second extension pivotally enjoined, each of said first and second extensions having been securely inserted within a respective open end of an adjacent one of said telescoping tubular sections, and a foothold adapted for stabilizing said hinge-fitting in connection with a ground.

11. The apparatus of claim 10:
(a) wherein each said foothold comprises a mechanism selected from the group consisting of a stake, elastomeric foot, bolt, screw, pin, alloy footing, rolling caster with locking means, and caster mechanism;
(b) wherein each said telescoping tubular section is made of a lightweight material having sufficient strength for the supporting of the article, said material selected from the group consisting of an alloy, resin, rigid plastic, and metal; and
(c) further comprising a detent pin fastener for interlocking said telescoping tubular sections at said selected length.

12. A collapsible apparatus for supporting an article, the apparatus comprising:
(a) a first, second, and third leg assembly;
(b) an upper end of each said leg assembly pivotally secured to extend from an upper support member in a generally symmetrical fashion;
(c) a lower end of each said leg assembly pivotally secured to extend from a lower collar support;
(d) each said leg assembly comprising a hinge-fitting interconnecting a first and second elongated subassembly, said hinge-fitting adapted to permit at least a pivot range of 90-degrees of rotation;
(e) each said hinge-fitting comprises a first and second extension pivotally enjoined;
(f) an insert having an inner-aperture shaped to accept an outer perimeter of said lower-end of the article, said insert shaped to releasably fit within an aperture in said lower collar support; and
(g) an anchor comprising a looped-end adapted to accept a fastener therethrough, each of said first and second extensions of said hinge-fitting having an outwardly facing recess for accepting said fastener.

13. A collapsible apparatus for supporting and article, the apparatus comprising:
(a) a first, second, and third leg assembly;
(b) an upper end of each said leg assembly pivotally secured to extend from an upper support member in a generally symmetrical fashion;
(c) a lower end of each said leg assembly pivotally secured to extend from a lower collar support;
(d) each said leg assembly comprising a hinge-fitting interconnecting a first and second elongated subassembly, said hinge-fitting adapted to permit at least a pivot range of 90-degrees of rotation;
(e) each said hinge-fitting further comprises a first and second extension, said second extension having an outwardly facing recess for accepting a foothold adapted for stabilizing said hinge-fitting in connection with a ground;

(f) each said first elongated subassembly comprises a plurality of telescoping tubular sections adapted for interlock;
(g) each said second elongated subassembly comprises a plurality of telescoping tubular sections adapted for interlock; and
(h) said telescoping tubular sections of said first elongated subassembly are sized for interchangeability with said telescoping tubular sections of said second elongated subassembly.

14. The apparatus of claim 1 wherein:
(a) a first, second, and third leg assembly;
(b) an upper end of each said leg assembly pivotally secured to extend from an upper support member in a generally symmetrical fashion;
(c) a lower end of each said leg assembly pivotally secured to extend from a lower collar support;
(d) each said leg assembly comprising a hinge-fitting interconnecting a first and second elongated subassembly, said hinge-fitting adapted to permit at least a pivot range of 90-degrees of rotation;
(e) each said hinge-fitting further comprises a locking mechanism for holding said hinge-fitting in any one of a plurality of directions within said pivot range;
(f) each said hinge-fitting further comprises a first and second extension, said first extension having an outwardly facing recess for accepting a fastener for use in connection with an anchor adapted for stabilizing said hinge-fitting in connection with a ground; and
(g) each of said first and second extensions has been securely inserted within a tubular end-section of a respective one of said first and second elongated subassemblies.

15. A collapsible apparatus for supporting an article, the apparatus comprising:
(a) a first, second, and third variable-length leg assembly;
(b) an upper end of each said leg assembly pivotally secured to extend from an upper support member in a generally symmetrical fashion;
(c) a lower end of each said leg assembly pivotally secured to extend from a lower support member;
(d) each said leg assembly comprising a hinge-fitting interconnecting a first and second elongated subassembly; and
(e) each said hinge-fitting comprising a first and second extension pivotally enjoined and adapted to permit a selected pivot range of rotation, each of said first and second extensions having been securely inserted within a tubular end-section of a respective one of said first and second elongated subassemblies.

16. The apparatus of claim 15 wherein:
(a) each said first elongated subassembly comprises a plurality of telescoping tubular sections adapted for interlock;
(b) each said second elongated subassembly comprises a plurality of telescoping tubular sections adapted for interlock; and
(c) said telescoping tubular sections of said first elongated subassembly are sized for interchangeability with said telescoping tubular sections of said second elongated subassembly.

17. The apparatus of claim 16:
(a) said upper support member comprises a plurality of fork extensions to which said upper ends of said leg assemblies are pivotally secured;
(b) said lower support member comprises a plurality of fork extensions to which said lower ends of said leg assemblies are pivotally secured;
(c) each said plurality of telescoping tubular sections have a cross-sectional shape selected from the group consisting of a square, rectangle, triangle, circle, oblong, and an irregular polygonal shape; and
(d) each said hinge-fitting further comprises a foothold adapted for stabilizing said hinge-fitting in connection with a ground.

18. The apparatus of claim 15:
wherein (a) the article is elongated in shape, (b) said upper support member comprises an aperture for accepting the elongated article, and (c) said lower support member is adapted for accepting a lower-end of the article; and
further comprising an insert having an inner-aperture shaped to accept an outer perimeter of the article, said insert shaped to releasably fit within said aperture in said upper support member.

19. The apparatus of claim 15:
(a) wherein said selected pivot range is up to 170-degrees of rotation and each said hinge-fitting comprises a locking mechanism for holding said hinge-fitting in any one of a plurality of directions within said pivot range; and
(b) further comprising an anchor comprising a looped-end adapted to accept a fastener therethrough, each of said first and second extensions of said hinge-fitting having an outwardly facing recess for accepting said fastener.

20. A collapsible apparatus for supporting an elongated article, the apparatus comprising:
(a) a first, second, and third leg assembly;
(b) an upper end of each said leg assembly pivotally secured to extend from an upper support member in a generally symmetrical fashion;
(c) said upper support member comprises an aperture for accepting the elongated article;
(d) a lower end of each said leg assembly pivotally secured to extend from a lower collar support adapted for accepting a lower-end of the article;
(e) each said leg assembly comprising a hinge-fitting interconnecting a first and second elongated subassembly;
(f) each said hinge-fitting comprises a first and second extension pivotally enjoined and adapted to permit at least a pivot range of 90-degrees of rotation such that said lower collar support is adaptable for placement on a ground with a vertical distance, $d_L$, from said upper support member to said lower collar support being greater than a vertical height, $h_{H-F}$, measured between said upper support member and each said hinge-fitting; and
(g) each of said first and second extensions is securely inserted within a tubular end-section of a respective one of said first and second elongated subassemblies.

21. The apparatus of claim 20 wherein:
each said first elongated subassembly comprises a plurality of telescoping tubular sections adapted for interlock.

22. A collapsible apparatus for supporting and elongated article, the apparatus comprising:
(a) a first, second, and third leg assembly;
(b) an upper end of each said leg assembly pivotally secured to extend from an upper support member in a generally symmetrical fashion;
(c) said upper support member comprises an aperture for accepting the elongated article;

(d) a lower end of each said leg assembly pivotally secured to extend from a lower collar support adapted for accepting a lower-end of the article;
(e) each said leg assembly comprising a hinge-fitting interconnecting a first and second elongated subassembly;
(f) each said hinge-fitting comprises a first and second extension pivotally enjoined and adapted to permit a pivot range of up to just less than 180-degrees of rotation, and said lower collar support is a vertical distance, $d_L$, from said upper support member; and
(g) with said pivot range at said just less than 180-degrees, said vertical distance, $d_L$, is greater than the sum of an overall length of said first elongated subassembly and an overall length of said second elongated subassembly.

23. A collapsible apparatus for supporting and elongated article, the apparatus comprising:
(a) a first, second, and third leg assembly;
(b) an upper end of each said leg assembly pivotally secured to extend from an upper support member in a generally symmetrical fashion;
(c) said upper support member comprises an aperture for accepting the elongated article;
(d) a lower end of each said leg assembly pivotally secured to extend from a lower collar support adapted for accepting a lower-end of the article;
(e) each said leg assembly comprising a hinge-fitting interconnecting a first and second elongated subassembly;
(f) wherein each said second elongated subassembly comprises a plurality of telescoping tubular sections adapted for interlock;
(g) wherein said telescoping tubular sections of said first elongated subassembly are sized for interchangeability with said telescoping tubular sections of said second elongated subassembly; and
(h) further comprising an insert having an inner-aperture shaped to accept a perimeter of the article, said insert shaped to releasably fit within said aperture in said upper support member.

24. The apparatus of claim 23 wherein each said hinge-fitting comprises a first and second extension pivotally enjoined; and further comprising:
(a) a second insert having an inner-aperture shaped to accept an outer perimeter of said lower-end of the article, said second insert shaped to releasably fit within an aperture in said lower collar support; and
(b) an anchor comprising a looped-end adapted to accept a fastener therethrough, each of said first and second extensions of said hinge-fitting having an outwardly facing recess for accepting said fastener.

* * * * *